United States Patent
Nock et al.

(10) Patent No.: US 9,085,248 B2
(45) Date of Patent: Jul. 21, 2015

(54) SEAT RECLINER WITH COAXIAL EASY ENTRY RELEASE

(75) Inventors: Eckhard Nock, Schweitenkirchen (DE); Johannes Barzen, Pfaffenhofen (DE)

(73) Assignee: Lear Corporation, Southfield, MI (US)

(*) Notice: Subject to any disclaimer, the term of this patent is extended or adjusted under 35 U.S.C. 154(b) by 787 days.

(21) Appl. No.: 13/348,885

(22) Filed: Jan. 12, 2012

(65) Prior Publication Data

US 2012/0205956 A1 Aug. 16, 2012

(30) Foreign Application Priority Data

Feb. 14, 2011 (DE) .................. 10 2011 004 090

(51) Int. Cl.
*B60N 2/20* (2006.01)
*B60N 2/225* (2006.01)
*B60N 2/235* (2006.01)

(52) U.S. Cl.
CPC ............... *B60N 2/2252* (2013.01); *B60N 2/20* (2013.01); *B60N 2/2254* (2013.01); *B60N 2/2358* (2013.01); *B60N 2205/50* (2013.01)

(58) Field of Classification Search
CPC ............. B60N 2205/50; B60N 2/2552; B60N 2/2554; B60N 2/2358; B60N 2/10; B60N 2/14; B60N 2/143; B60N 2/146; B60N 2/20; B60N 2/22; B60N 2/235
See application file for complete search history.

(56) References Cited

U.S. PATENT DOCUMENTS

| | | | |
|---|---|---|---|
| 4,629,251 A | 12/1986 | Tezuka | |
| 4,634,181 A | 1/1987 | Pipon | |
| 4,668,013 A | 5/1987 | Wahlmann | |
| 4,930,841 A | 6/1990 | Wittig | |
| 5,536,217 A | 7/1996 | Droulon et al. | |
| 5,590,931 A * | 1/1997 | Fourrey et al. | 297/366 |
| 5,611,599 A | 3/1997 | Baloche et al. | |
| 5,755,491 A | 5/1998 | Baloche et al. | |
| 6,164,723 A * | 12/2000 | Ganot | 297/378.12 |
| 7,677,665 B2 | 3/2010 | Eppert et al. | |
| 8,931,843 B2 * | 1/2015 | Schuler et al. | 297/367 R |
| 2006/0170269 A1* | 8/2006 | Oki | 297/367 |
| 2007/0108824 A1* | 5/2007 | Lange | 297/367 |
| 2007/0126272 A1 | 6/2007 | Deptolla | |
| 2008/0093906 A1* | 4/2008 | Gruson | 297/361.1 |
| 2010/0117429 A1* | 5/2010 | Mitsuhashi | 297/354.12 |
| 2011/0006583 A1 | 1/2011 | Schwarze et al. | |
| 2012/0032481 A1* | 2/2012 | D'Agostini | 297/216.13 |
| 2012/0205956 A1* | 8/2012 | Nock et al. | 297/362 |
| 2014/0225411 A1* | 8/2014 | Matt | 297/362 |
| 2014/0239693 A1* | 8/2014 | Nock et al. | 297/361.1 |

FOREIGN PATENT DOCUMENTS

| | | |
|---|---|---|
| CN | 1157784 A | 8/1997 |
| CN | 1293627 A | 5/2001 |

(Continued)

*Primary Examiner* — David R Dunn
*Assistant Examiner* — Timothy J Brindley
(74) *Attorney, Agent, or Firm* — Brooks Kushman P.C.

(57) ABSTRACT

A vehicle seat and reclining mechanism are disclosed that provide for adjusting the angle of inclination of a seat back relative to a seat base and also permits easy entry to the area behind the seat by allowing the seat back to be released to move between an adjusted angle of inclination and a position in which the seat back is folded over the seat base. The reclining mechanism may include three or four release mechanisms that are all coaxially attached to the vehicle seat to permit the seat back to pivot about a single axis.

19 Claims, 6 Drawing Sheets

(56) References Cited

FOREIGN PATENT DOCUMENTS

| CN | 1914062 A | 2/2007 |
| CN | 101252856 A | 8/2008 |
| CN | 101415584 A | 4/2009 |
| DE | 103 35 405 | 2/2005 |
| DE | 10 2009 029 858 | 12/2010 |
| DE | 20 2010 015 093 | 1/2011 |
| DE | 20 2010 015 143 | 1/2011 |
| EP | 1462301 A2 | 9/2004 |
| WO | WO 2011/023331 * | 3/2011 |

* cited by examiner

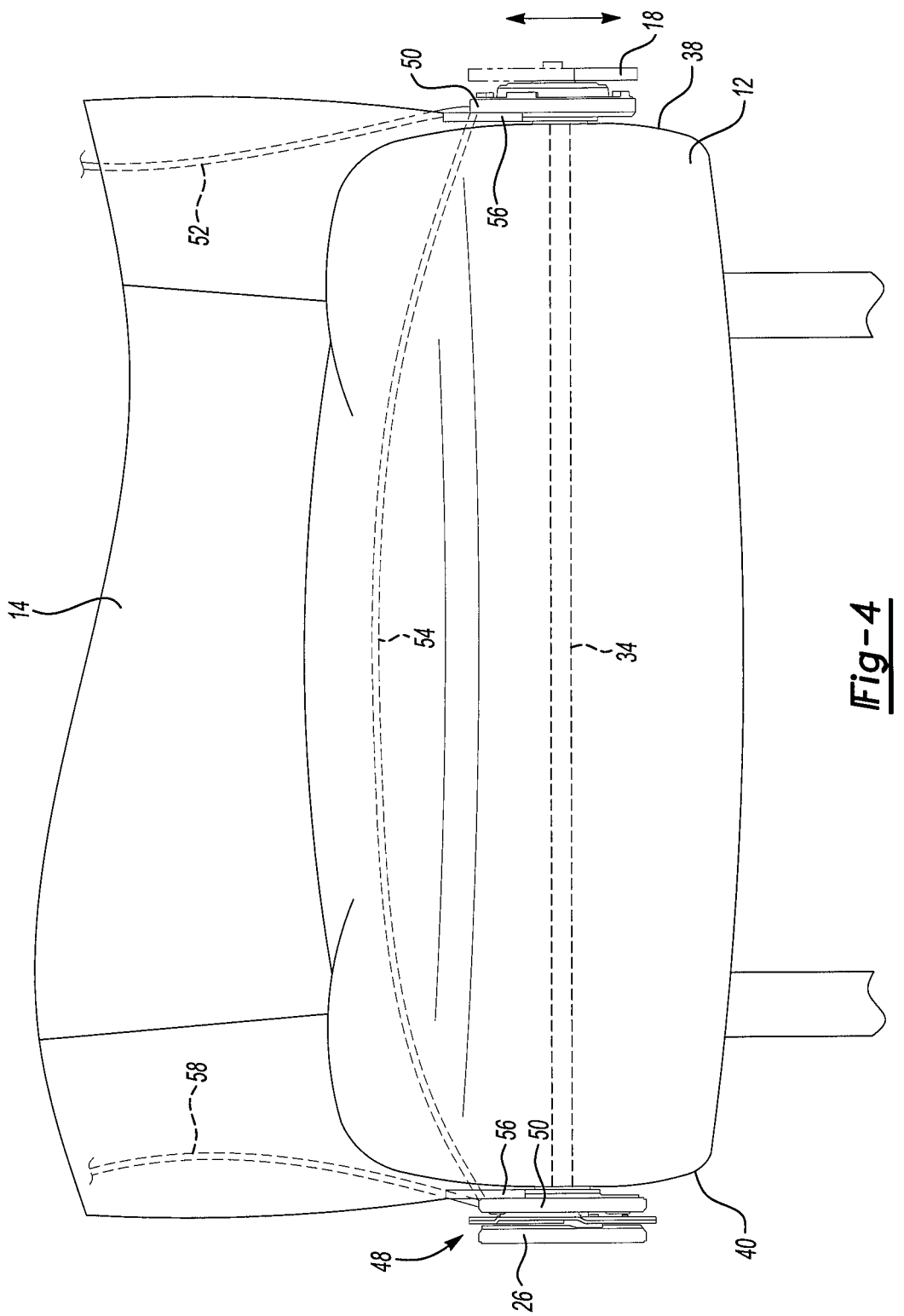

SEAT RECLINER WITH COAXIAL EASY ENTRY RELEASE

CROSS-REFERENCE TO RELATED APPLICATIONS

This application claims foreign priority benefits under 35 U.S.C. §119(a)-(d) to DE 10 2011 004 090.0, filed Feb. 14, 2011, the disclosure of which is hereby incorporated by reference in its entirety.

TECHNICAL FIELD

The present invention relates to seat back reclining mechanisms that cooperate with an easy entry seat release mechanism.

BACKGROUND

Seat reclining mechanisms and easy entry seat release mechanisms are known and examples of prior art patents disclosing such devices include but are not limited to U.S. Pat. Nos. 5,611,599; 5,755,491; 5,536,217; 4,930,841; 4,668,013; 4,634,181; and 4,629,251.

SUMMARY

A recliner apparatus is provided for a vehicle seat that includes a seat base and a seat back that may be adjusted to change the angle of inclination of the seat back and that may also be released to permit easy entry to seats or storage areas located behind the vehicle seat. In one embodiment of the recliner apparatus, a shaft having a first end portion extends outboard of a first side of the seat base and a second end portion extends outboard of a second side of the seat base. The shaft pivots about a pivot axis. First and second recliners connect the seat back to the first and second end portions of the shaft and are adjustable about the pivot axis to selectively hold the seat back at a selected angle within a range of tilt angles. A third recliner connects the first recliner to the seat back and is attached coaxially to the first recliner to pivot the seat back about the pivot axis between a forwardly folded position and the selected angle.

Other features and aspects of the recliner apparatus may include providing first and second recliners that are disengaged while being adjusted to the selected angle. Further, the third recliner may be operatively connected to the second recliner so that the second and third recliners may be disengaged to pivot the seat back between the forwardly folded position and the selected angle. The first and second recliners may be disengaged by actuating a first manual actuator to adjust the seat back to the selected angle. The second and third recliners may be disengaged by actuating a second manual actuator to pivot the seat back between the forwardly folded position and the selected angle. The first and second recliners may be disengaged by pivoting the shaft to disengage each of the first and second recliners by rotating a cam that disengages a plurality of locking elements from a gear ring provided in each of the first and second recliners.

Another embodiment of recliner apparatus described above may include a fourth recliner that connects the second recliner to the seat back and is adjustable about the pivot axis. The fourth recliner is provided to pivot the seat back between a forwardly folded position and the selected angle. In the embodiment of the recliner apparatus having a fourth recliner, the first and second recliners may be continuously engaged while being adjusted to the selected angle. For example, the continuously engaged recliners may each have an eccentric gear set in which an inner gear is rotated by the shaft to drive a gear ring that is continuously engaged by the inner gear. The third recliner and fourth recliners are disengaged as the seat back is pivoted between the forwardly folded and the selected angle.

Continuous type recliners and discontinuous recliners that are adjustable in small increments may be referred to a "comfort recliners" that are used to set the angle of inclination of the seat back to a comfortable position for the seat occupant. Discontinuous recliners are used as the "easy entry recliners" that are released to move the seat back between the folded forward position and the selected or comfort position. Discontinuous recliners used for comfort adjustment or easy entry are generally similar in structure with the easy entry type having end stops that permit a wide range of motion, for example, about 90 degrees. The specific range may of course be more or less than 90 degrees depending upon the design of the seat and the range of motion that is necessary to move the seat from the upright comfort position to the folded forward position.

There are a wide variety of recliner mechanisms of both the continuous and discontinuous type. Even though two specific designs of the two types of recliners are specifically disclosed, the invention should not be interpreted as being limited to any specific type of recliner. Continuous recliners are continuously engaged and current designs do not lend themselves to releasing for rapid travel which is preferred for easy entry mechanisms. Discontinuous recliners of conventional design may be used for comfort adjustment according to the invention. Conventional discontinuous recliners can be adapted to provide easy entry with memory by changing the end stop locations or modifying the control plate elements.

One or two easy entry discontinuous recliners may be combined with two discontinuous recliners to provide both comfort and easy entry functions. Two easy entry discontinuous recliners and two continuous recliners may be combined with two discontinuous recliners to provide both comfort and easy entry functions.

According to another aspect of the disclosure twin continuous and discontinuous recliners may be provided on opposite sides of a vehicle seat. The twin recliner apparatus may include a shaft having a first end portion that extends outboard of a first side of the seat base and a second end portion that extends outboard of a second side of the seat base. The shaft is mounted in the seat to pivot about a pivot axis. A first continuous recliner connects the seat back to the first end portion of the shaft and is adjustable about the pivot axis to selectively hold the seat back at a selected angle within a range of tilt angles. A second continuous recliner connects the seat back to the second end portion of the shaft and is adjustable about the pivot axis to selectively hold the seat back at the selected angle. A first discontinuous recliner connects the first continuous recliner to the seat back and is attached coaxially to the first continuous recliner. The first discontinuous recliner is provided to pivot the seat back about the pivot axis between a forwardly folded position and the selected angle. A second discontinuous recliner connects the second continuous recliner to the seat back and is attached coaxially to the second continuous recliner. The second discontinuous recliner is provided to pivot the seat back about the pivot axis between a forwardly folded position and the selected angle.

According to one aspect of the invention in which a fourth recliner is provided, the shaft may be is connected to a motor that rotates the shaft to adjust the first and second recliners to the selected angle. Alternatively, the shaft may be connected to a rotatable knob that rotates the shaft to adjust the first and second recliners to the selected angle.

In the three recliner embodiment, the recliner apparatus may also include a first weld plate that is attached to one recliner and a second weld plate that is attached to another recliner that are welded together.

In the four recliner embodiment, a first weld plate may be attached to one recliner and a second weld plate may be attached to another recliner. The weld plates are welded together to connect the two recliners. Further, the two recliners on the other side of the seat may be welded together in the same manner.

The invention may also be characterized as a vehicle seat that includes a seat back that is pivotally connected to a seat base to pivot about an axis with two continuous and two discontinuous recliner mechanisms. The first continuous recliner connects the seat back to the seat base and is adjustable about the pivot axis to selectively hold the seat back at a selected angle within a range of tilt angles. The second continuous recliner connects the seat back to the seat base and is adjustable about the pivot axis to selectively hold the seat back at the selected angle. The first discontinuous recliner connects the first continuous recliner to the seat back and is attached coaxially to the first continuous recliner. The first discontinuous recliner is provided to pivot the seat back about the pivot axis between a forwardly folded position and the selected angle. The second discontinuous recliner connects the second continuous recliner to the seat back and is attached coaxially to the second continuous recliner. The second discontinuous recliner is provided to pivot the seat back about the pivot axis between the forwardly folded position and the selected angle.

Another alternative aspect of the vehicle seat embodiment relates to providing a first weld plate that is attached to the first continuous recliner and a second weld plate that is attached to the first discontinuous recliner that are welded together to connect the first continuous recliner to the first discontinuous recliner. A third weld plate is attached to the second continuous recliner and a fourth weld plate is attached to the second discontinuous recliner that are welded together to connect the second continuous recliner to the second discontinuous recliner. The weld plates allow twin recliners to be provided on opposite sides of the seat that permit comfort tilt adjustment of the seat back and also easy entry with memory as to the previously adjusted seat back position.

These and other aspects of the present invention will be better understood in view of the attached drawings and the following detailed description of the illustrated embodiments.

BRIEF DESCRIPTION OF THE DRAWINGS

FIG. 4 is a fragmentary front elevation view of a vehicle seat that is provided with a discontinuous/easy entry recliner assembly on one side of the vehicle seat and a slave discontinuous comfort recliner on the opposite side of the vehicle seat.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
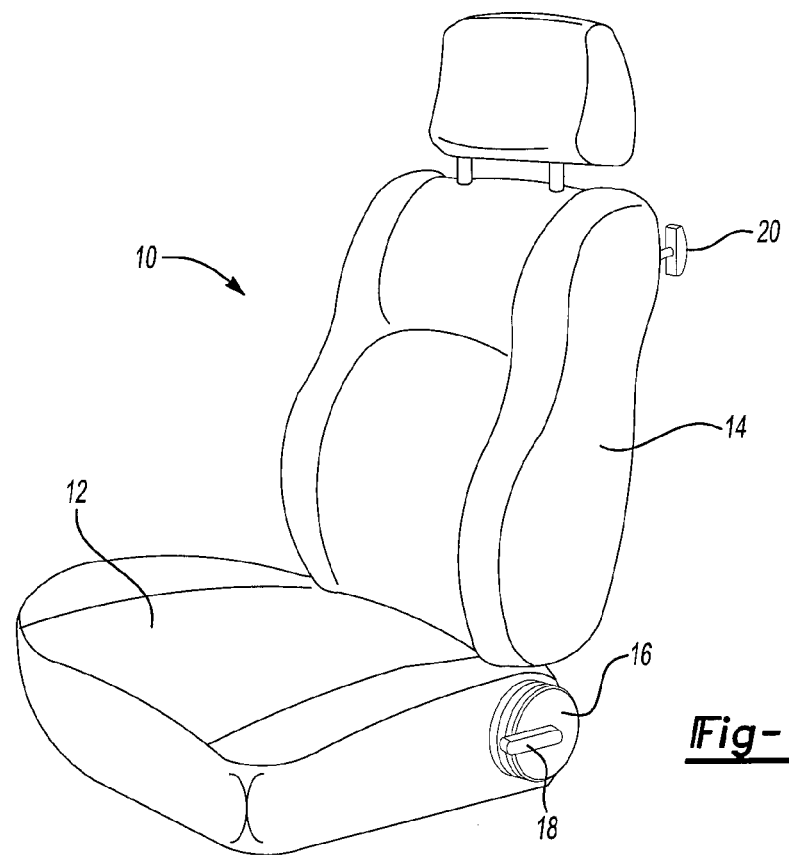
FIG. 1 is a perspective view of a vehicle seat that is provided with a coaxial comfort and easy entry recliner assembly.

Referring to FIG. 1, a vehicle seat 10 is illustrated that includes a seat base 12 and a seat back 14. A twin recliner assembly 16 is used to adjust the angular orientation of the seat back 14 relative to the seat base 12 in a comfort adjustment mode. The twin recliner assembly 16 also permits the seat back 14 to be folded flat over the seat base 12 in an easy entry with memory mode of operation. An adjustment handle 18 is provided on the twin recliner assembly 16 to permit manual adjustment of the twin recliner assembly 16 in some embodiments. An easy entry release handle 20 is provided on the seat back 14 that is used to actuate the easy entry portion of the twin recliner assembly 16.

Figure 2:
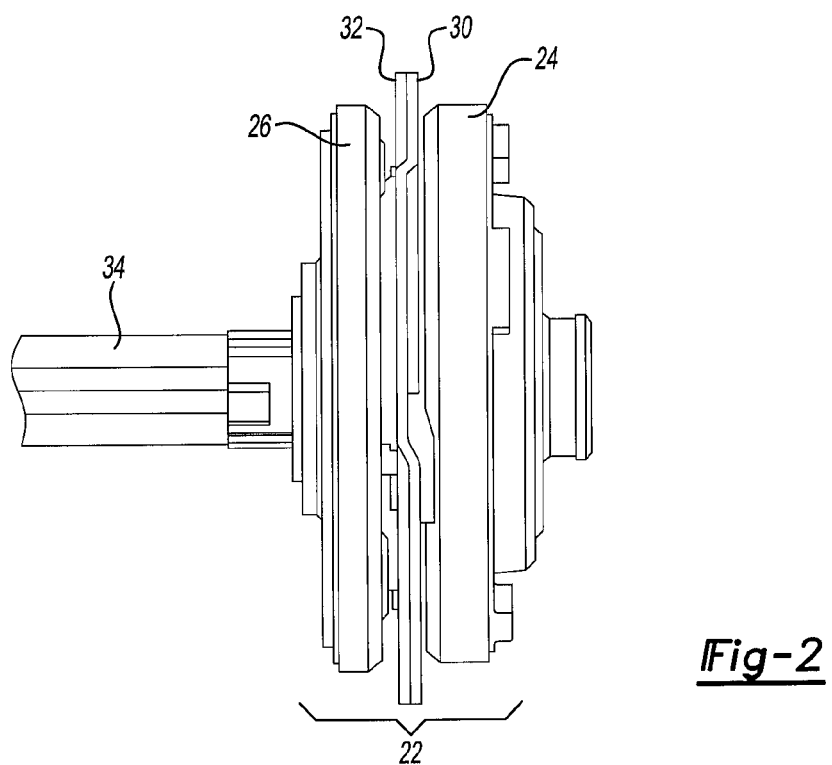
FIG. 2 is a front elevation view of a continuous/easy entry recliner assembly made according to one embodiment of the present invention.

Referring to FIG. 2, a continuous/easy entry assembly 22 is illustrated that includes a continuous recliner 24 that is attached to a discontinuous/easy entry recliner 26. Many different types of continuous recliners and discontinuous recliners are available that may be adapted to provide the dual mode of operation wherein both a comfort adjustment and easy entry adjustment may be provided by a twin recliner assembly and Applicants' invention should not be limited to one particular type of recliner mechanism or another.

The continuous recliner 24 is provided with a first weld plate 30 that is welded to a second weld plate 32 that is connected to the discontinuous/easy entry recliner 26. The continuous/easy entry assembly 22 is attached to an end portion of a shaft 34 that extends transversely across the seat base 12 as shown in FIG. 3.

Figure 3:
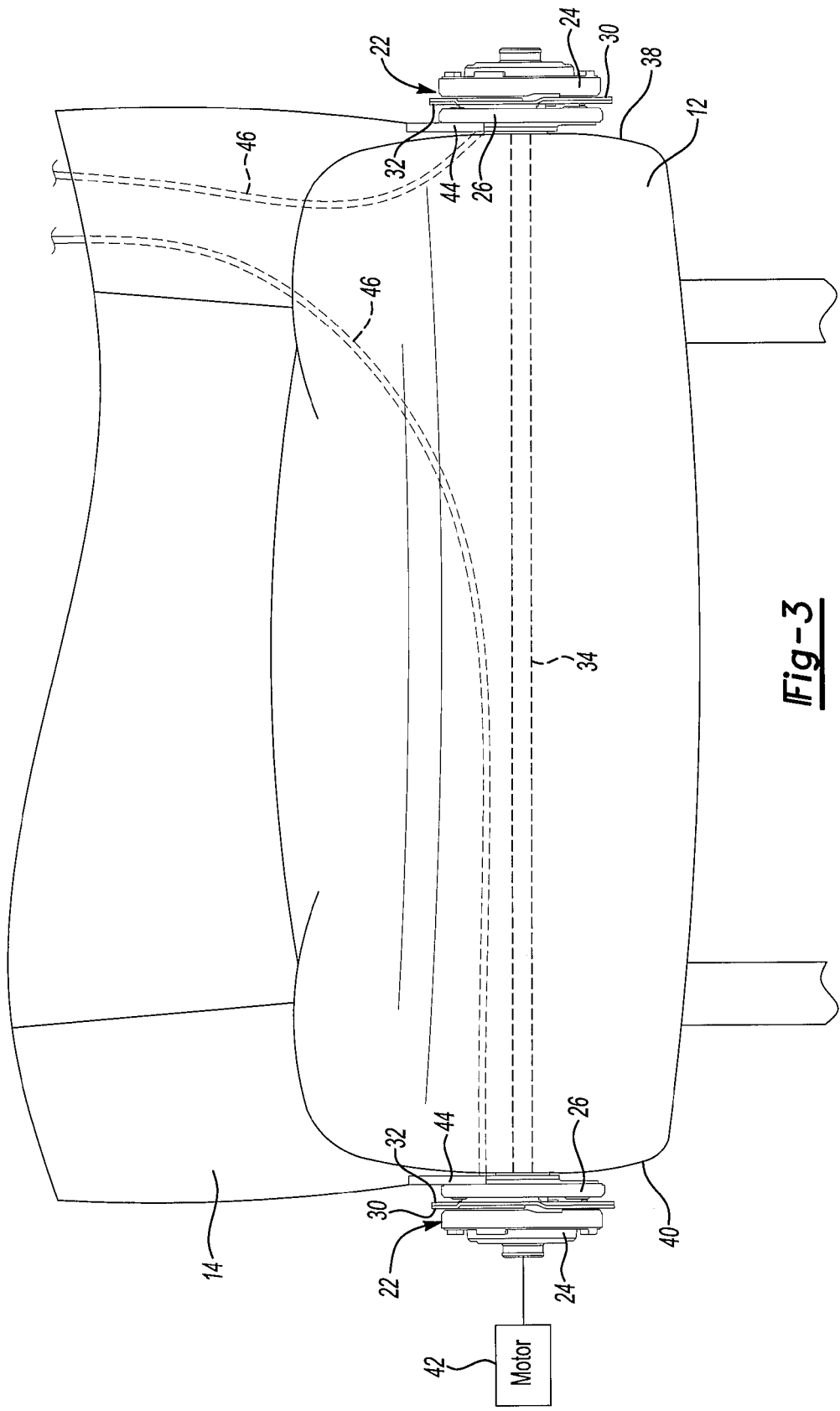
FIG. 3 is a fragmentary front elevation view of a vehicle seat that is provided with a continuous/easy entry recliner assembly that is attached to opposite sides of a seat base that optionally may be provided with a motor according to one embodiment of the present invention.

Referring to FIG. 3, a seat base 12 and seat back 14 are shown with a pair of continuous/easy entry assemblies 22 on a first side 38 and a second side 40 of the seat base 12. The continuous/easy entry assemblies 22 on each side include a continuous recliner 24 that is connected to a discontinuous recliner 26 by the first and second weld plates 30 and 32. The shaft 34 connects the assemblies 22 through the seat base 12. In the comfort adjustment mode, the motor 42 or the manual knob, may be used to turn the continuous recliner 24 on one side of the seat with the rotation of the shaft 34 communicating the rotation to the other side. A lever 44 is operatively connected to the discontinuous/easy entry recliner mechanisms 26 that are provided inboard of the continuous recliners 24 on both sides of the seat base 12. The levers 44 are operated by control cables 46 that extend to the easy entry release handle 20 (shown in FIG. 1). The easy entry release handle 20 is actuated to shift the control cables 46 and pivot the levers 44 to release the discontinuous easy entry recliner 26.

Referring to FIG. 4, another alternative embodiment is illustrated that includes a discontinuous/easy entry assembly 48 on the second side 40 of the seat base 12 and a discontinuous comfort recliner 50 on the first side 30 of the seat base 12. The discontinuous/easy entry assembly 48 controls the discontinuous comfort recliner 50 in one embodiment by transmitting rotational movements through the shaft 34 when the seat back 14 is adjusted in the comfort mode. When it is desired to provide the easy entry function, a first easy entry control cable 52 is actuated by actuating the easy entry release handle 20 shown in FIG. 1. When the first easy entry control cable 52 is shifted, a slave control cable 54 releases or engages the discontinuous comfort recliner 50. A lever 56 is provided on the discontinuous/easy entry assembly 48 and on the discontinuous comfort recliner 50 that is operated by the control cables 52, 54.

While the embodiment of FIG. 4 is shown with a discontinuous/easy entry assembly 48 on one side, it is also possible to provide two discontinuous/easy entry assemblies 48 on opposite sides of the seat base 12. If so, both may be operated by means of a first easy entry control cable and a second easy entry control cable 58 that may be used to actuate the recliner assemblies in the easy entry mode.

Figure 5A:
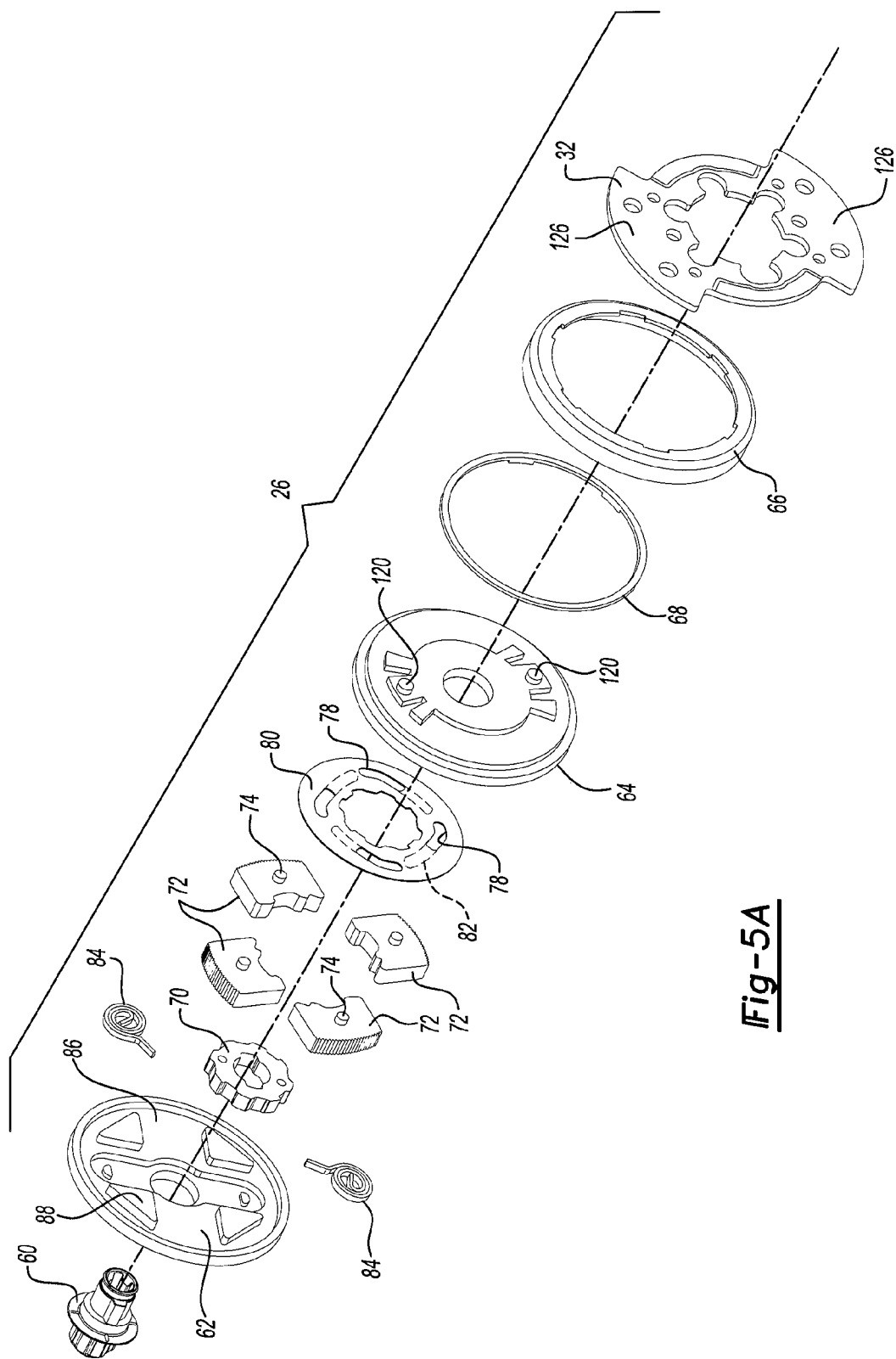
FIGS. 5A-B are an exploded perspective view of a continuous recliner and a discontinuous easy entry recliner that are attached by a pair of weld plates to form a continuous/easy entry recliner assembly.
Figure 5B:
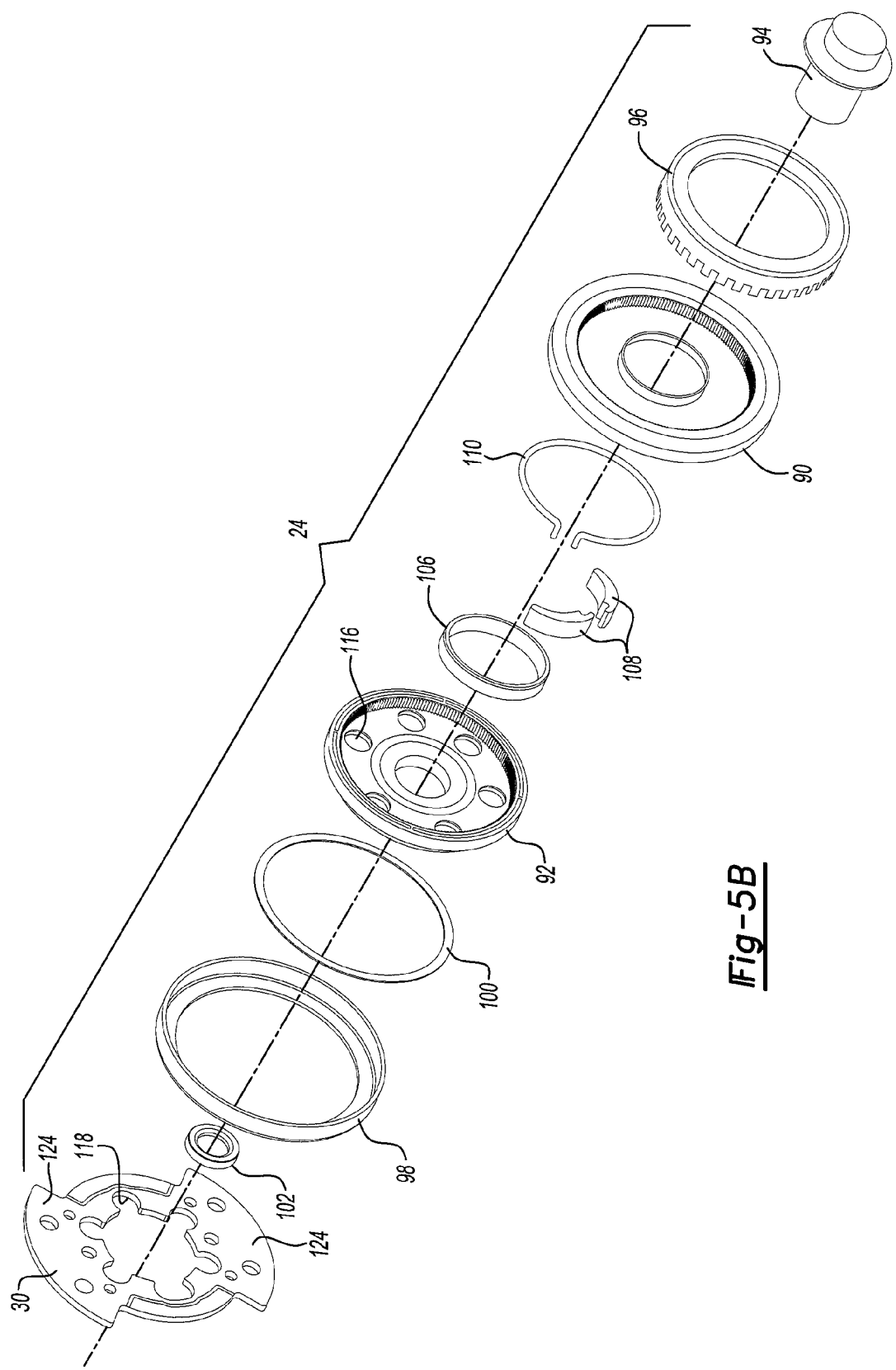

Referring to FIGS. 5A and 5B, a continuous/easy entry assembly 22, as previously described with reference to FIGS. 2 and 3, is shown in the exploded perspective view. The portion of the assembly 22 shown in FIG. 5A includes the discontinuous easy entry recliner 26 while the portion of the assembly 22 shown in FIG. 5B includes the continuous recliner 24. It should be understood that the discontinuous recliner shown in FIG. 5A and continuous recliner shown in FIG. 5B are intended as mere examples of recliner mechanisms that may be used in accordance with the present invention. The description of the continuous/easy entry assembly 22 is provided to facilitate implementation of Applicants' invention. It should be understood that the discontinuous/easy entry assembly described with reference to FIG. 4 would include a discontinuous easy entry recliner 26 and a discontinuous comfort recliner 50 as described with reference to FIG. 4.

Referring to FIG. 5A, a hub 60 is illustrated that is adapted to be connected to the shaft 34 shown in FIG. 3. A guide plate 62 is assembled to a gear plate 64 and held together by means of a case ring 66 on the outer periphery of the plates 62, 64. The hub 60 extends through the guide plate 62 and gear plate 64. A spacer 68 is provided between the case ring 66 and the gear plate 64 for the purpose of noise reduction. A cam 70 is secured to the hub 60 and is used to extend and retract a plurality of pawls 72 that are driven into engagement with, and released from, the gear plate 64 by rotating the hub 60 and cam 70 with the shaft 34.

Each of the pawls 72 includes a protrusion 74 that adapted to be received in corresponding slots 78 formed in a control plate 80. The control plate 80 is used to hold the pawls 72 out of engagement with the gear plate 64 until the seat back 14 is adjusted to the desired angular orientation relative to the seat base 12. The same general arrangement may be used to provide an easy entry mode of operation by providing a plurality of elongated slots 82 in the control plate 80. The elongated slots 82 are shown in phantom lines in FIG. 5A. By elongating the slots, a range of free rotation of the seat back 14 may be extended to provide free travel between the adjusted position and a fold flat position of the seat back 14. Range of motion may be approximately 90 degrees free travel and two latching positions may be established corresponding to the two positions of the seat back. When the seat back is returned to the upright position, the discontinuous comfort recliner 50 remains in the same position and thereby provides a "memory" of the previous comfort adjustment position. In other embodiments of the discontinuous recliner, end stops may be provided inside the guide plate 62 and gear plate 64 to provide range of motion stops instead of the slot in the control plate.

A plurality of springs 84 are mounted to the guide plate 62 to bias the cam 70 to engage the pawls 72 causing them to engage the gear plate 64. The pawls 72 are received in channels 86 formed by guides 88 that are integrally formed in the guide plate 62.

The weld plate 32 is also illustrated in FIG. 5A that is adapted to be secured to the gear plate 64. The weld plate 32 may be welded or otherwise secured to the gear plate 64 and is provided to facilitate connecting the discontinuous easy entry recliner 26 to the continuous recliner 24 illustrated in FIG. 5B.

Referring to FIG. 5B, the continuous recliner 24 is shown to include an inner gear plate 90 that is received by an outer gear plate 92 in a continuously meshing relationship. A driver 94 is received within the inner gear plate 90 and the outer gear plate 92. A cover 96 is retained by the driver to provide a lubricant seal and exclude contamination from the inner and outer gear plates 90 and 92. A case ring 98 holds the inner and outer gear plates 90, 92 together in a relatively rotatable relationship. A spacer 100 is provided between the case ring 98 and the outer gear ring 92. A retainer clip 102 is secured to the hub 94 to retain the hub within the gear plates 90 and 92. A bearing ring 106 is retained in the outer gear plate 92. A pair of wedges 108 is inserted inside the bearing ring 106 and are urged apart by means of a spring 110. The wedges 108 provide an eccentric connection between the inner and outer gear plates 90 and 92 so that as the inner gear plate 90 is rotated, the outer gear plate 92 rotates incrementally.

Figure 6:
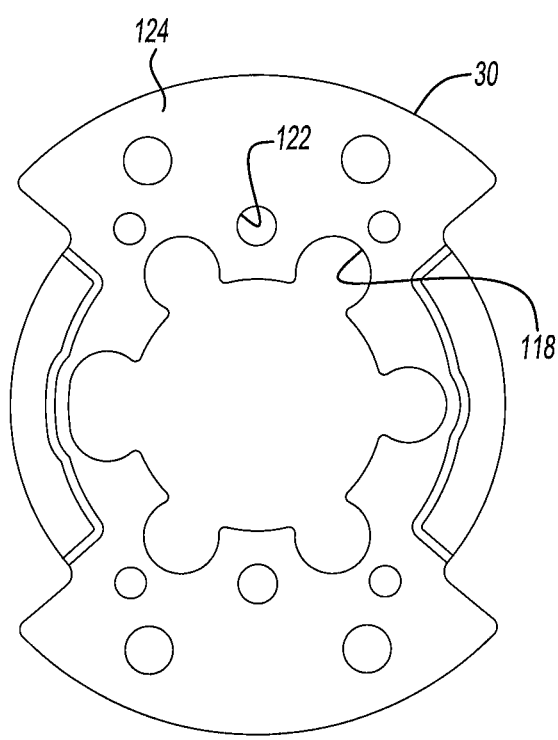
FIG. 6 is a side elevation view of a weld plate that may be used with another weld plate to connect two recliner assemblies together to form a twin recliner assembly according to one embodiment of the present invention.

Referring to FIG. 6, a weld plate 30 is illustrated and is used to secure a comfort adjustment recliner to an easy entry recliner. The continuous or discontinuous recliners may be used individually to provide comfort adjustment on conventional vehicle seats. The weld plate 30 that may be attached to another weld plate 32 to join two recliners together in a coaxial relationship this is aligned with the central axis of the shaft 34. The weld plate 30 includes openings 18 that are adapted to receive posts 116 as shown in FIG. 5B that are normally used to secure the recliner to the seat frame (not shown). The posts 116 shown in FIG. 5 are received in the openings 118 so that the weld plate 30 may be welded to the outer gear plate 92. Similarly, a weld plate 32 as shown in FIG. 5B may be welded to the gear plate 64 with two protrusions 120 being received in two openings 122. The protrusions 120 are formed in the exterior surface of the gear plate 64 and the openings 122 are provided in the weld plate 32 to align the parts. The weld plates 30 and 32 are then welded together by conventional welding techniques to weld a first set of flanges 124 on the first weld plate to a second set of weld flanges 126 that are provided on the second weld plate 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A recliner apparatus for a vehicle seat that includes a seat base and a seat back, the recliner apparatus comprising:

a shaft having a first end portion that extends outboard of a first side of the seat base and a second end portion that extends outboard of a second side of the seat base, wherein the shaft pivots about a pivot axis;

a first recliner that is attached to the first end portion of the shaft and is adjustable about the pivot axis to selectively hold the seat back at a selected angle within a range of tilt angles;

a second recliner that connects the seat back to the second end portion of the shaft and is adjustable about the pivot axis to selectively hold the seat back at the selected angle;

a third recliner that connects the first recliner to the seat back and is attached coaxially to the first recliner, the third recliner being provided to pivot the seat back about the pivot axis between a forwardly folded position and the selected angle;

a first weld plate attached to the first recliner; and a second weld plate attached to the third recliner, wherein the first and second weld plates are welded together to connect the first recliner to the third recliner.

2. The recliner apparatus of claim 1 wherein the first and second recliners are disengaged while being adjusted to the selected angle and the third recliner is operatively connected to the second recliner, wherein the second and third recliners are disengaged while the seat back pivots between the forwardly folded position and the selected angle.

3. The recliner apparatus of claim 2 wherein the first and second recliners are disengaged by actuating a first manual actuator to adjust the seat back to the selected angle and the second and third recliners are disengaged by actuating a second manual actuator to pivot the seat back between the forwardly folded position and the selected angle.

4. The recliner apparatus of claim 3 wherein the first and second recliners are disengaged by pivoting the shaft to disengage each of the first and second recliners by rotating a cam that disengages a plurality of locking elements from a gear ring provided in each of the first and second recliners.

5. The recliner apparatus of claim 1 further comprising a fourth recliner that connects the second recliner to the seat back and is adjustable about the pivot axis, the fourth recliner being provided to pivot the seat back between a forwardly folded position and the selected angle.

6. The recliner apparatus of claim 5 wherein the first and second recliners are continuously engaged while being adjusted to the selected angle and the third recliner and fourth recliners are disengaged as the seat back is pivoted between the forwardly folded and the selected angle.

7. The recliner apparatus of claim 6 wherein the first and second recliners each have an eccentric gear set in which an inner gear is rotated by the shaft to drive a gear ring that is continuously engaged by the inner gear, wherein the inner gear and the gear ring are eccentric to each other.

8. The recliner apparatus of claim 6 wherein the shaft is connected to a motor that rotates the shaft to adjust the first and second recliners to the selected angle.

9. The recliner apparatus of claim 6 wherein the shaft is connected to a rotatable knob that rotates the shaft to adjust the first and second recliners to the selected angle.

10. The recliner apparatus of claim 5 wherein a third weld plate is attached to the second recliner and a fourth weld plate is attached to the fourth recliner that are welded together to connect the second recliner to the fourth recliner.

11. A recliner apparatus for a vehicle seat that includes a seat base and a seat back, the recliner apparatus comprising:

a shaft having a first end portion that extends outboard of a first side of the seat base and a second end portion that extends outboard of a second side of the seat base, wherein the shaft pivots about a pivot axis;

a first continuous recliner that is attached to the first end portion of the shaft and is adjustable about the pivot axis to selectively hold the seat back at a selected angle within a range of tilt angles;

a second continuous recliner that connects the seat back to the second end portion of the shaft and is adjustable about the pivot axis to selectively hold the seat back at the selected angle;

a first discontinuous recliner that connects the first continuous recliner to the seat back and is attached coaxially to the first continuous recliner, the first discontinuous recliner being provided to pivot the seat back about the pivot axis between a forwardly folded position and the selected angle; and a second discontinuous recliner that connects the second continuous recliner to the seat back and is attached coaxially to the second continuous recliner, the second discontinuous recliner being provided to pivot the seat back about the pivot axis between a forwardly folded position and the selected angle;

a first weld plate attached to the first continuous recliner; and a second weld plate attached to the first discontinuous recliner, wherein the first and second weld plates are welded together to connect the first continuous recliner to the first discontinuous recliner.

12. The recliner apparatus of claim 11 wherein the first and second continuous recliners each have an eccentric gear set in which an inner gear is rotated by the shaft to drive a gear ring that is continuously engaged by the inner gear, wherein the inner gear and the gear ring are eccentric to each other.

13. The recliner apparatus of claim 11 wherein the shaft is connected to a motor that rotates the shaft to adjust the first and second continuous recliners to the selected angle.

14. The recliner apparatus of claim 11 wherein the shaft is connected to a rotatable knob that rotates the shaft to adjust the first and second continuous recliners to the selected angle.

15. The recliner apparatus of claim 11 wherein a third weld plate is attached to the second continuous recliner and a fourth weld plate is attached to the second discontinuous recliner that are welded together to connect the second continuous recliner to the second discontinuous recliner.

16. The recliner apparatus of claim 11 wherein the first and second discontinuous recliners are disengaged while the seat back pivots between the forwardly folded position and the selected angle.

17. The recliner apparatus of claim 11 wherein the first and second discontinuous recliners are disengaged by pivoting the shaft to disengage each of the first and second discontinuous recliners by rotating a cam that disengages a plurality of locking elements from a gear ring provided in each of the first and second recliners.

18. A vehicle seat comprising:

a seat base;

a seat back that is pivotally connected to the seat base to pivot about an axis;

a first continuous recliner connected to the seat base;

a second continuous recliner connected to the seat base;

a first discontinuous recliner attached coaxially to the first continuous recliner and attached to the seat back, the first discontinuous recliner being provided to pivot the seat back about the pivot axis between a forwardly folded position and the selected angle, wherein the first continuous recliner is adjustable about the pivot axis to selectively hold the seat back at a selected angle within a range of tilt angles;

a second discontinuous recliner attached coaxially to the second continuous recliner and attached to the seat back, the second discontinuous recliner being provided to pivot the seat back about the pivot axis between a forwardly folded position and the selected angle, wherein the second continuous recliner is adjustable about the pivot axis to selectively hold the seat back at a selected angle within a range of tilt angles;

a first weld plate attached to the first continuous recliner; and a second weld plate attached to the first discontinuous recliner, wherein the first and second weld plates are welded together to connect the first continuous recliner to the first discontinuous recliner.

19. The vehicle seat of claim 18 wherein a third weld plate is attached to the second continuous recliner and a fourth weld plate is attached to the second discontinuous recliner that are welded together to connect the second continuous recliner to the second discontinuous recliner.

\* \* \* \* \*